US011359053B2

(12) United States Patent
Vercoulen et al.

(10) Patent No.: US 11,359,053 B2
(45) Date of Patent: Jun. 14, 2022

(54) FILM-FORMING DISPERSION AND SIZING DISPERSION

(71) Applicant: ACR III B.V., Zandpol (NL)

(72) Inventors: Paul Vercoulen, Zwolle (NL); Luca Amato, Erbusco (IT); Simona Villa, Bonate Sopra (IT)

(73) Assignee: ACR III B.V., Zandpol (NL)

( * ) Notice: Subject to any disclaimer, the term of this patent is extended or adjusted under 35 U.S.C. 154(b) by 0 days.

(21) Appl. No.: 16/639,317

(22) PCT Filed: Aug. 21, 2018

(86) PCT No.: PCT/EP2018/072483
§ 371 (c)(1),
(2) Date: Feb. 14, 2020

(87) PCT Pub. No.: WO2019/038249
PCT Pub. Date: Feb. 28, 2019

(65) Prior Publication Data
US 2021/0139649 A1    May 13, 2021

(30) Foreign Application Priority Data

Aug. 21, 2017 (EP) .................................. 17187074

(51) Int. Cl.
| | | |
|---|---|---|
| *C08G 69/48* | (2006.01) | |
| *C08J 5/04* | (2006.01) | |
| *C08K 3/22* | (2006.01) | |
| *C08K 5/092* | (2006.01) | |
| *C08K 5/19* | (2006.01) | |
| *C08K 5/42* | (2006.01) | |
| *C08K 9/08* | (2006.01) | |
| *C08L 77/00* | (2006.01) | |

(52) U.S. Cl.
CPC .............. *C08G 69/48* (2013.01); *C08J 5/042* (2013.01); *C08K 3/22* (2013.01); *C08K 5/092* (2013.01); *C08K 5/19* (2013.01); *C08K 5/42* (2013.01); *C08K 9/08* (2013.01); *C08L 77/00* (2013.01); *C08K 2201/005* (2013.01); *C08K 2201/011* (2013.01); *C08K 2201/019* (2013.01); *C08L 2201/54* (2013.01); *C08L 2203/16* (2013.01)

(58) Field of Classification Search
CPC . C08G 69/48; C08J 5/042; C08K 3/22; C08K 5/092; C08K 5/19; C08K 5/42; C08K 9/08; C08K 2201/005; C08K 2201/011; C08K 2201/019; C08L 77/00; C08L 2203/16
See application file for complete search history.

(56) References Cited

U.S. PATENT DOCUMENTS

2006/0177490 A1    8/2006  Massouda

FOREIGN PATENT DOCUMENTS

| | | |
|---|---|---|
| CN | 1159217 A | 9/1997 |
| CN | 102686674 A | 9/2012 |
| CN | 103387344 A | 11/2013 |
| EP | 0 587 114 A2 | 3/1994 |
| JP | 2010-090188 A | 4/2010 |
| WO | WO 2005/019315 A1 | 3/2005 |
| WO | WO 2014/136888 A1 | 12/2014 |
| WO | WO 2015/173498 A1 | 11/2015 |
| WO | WO 2015/200591 A1 | 12/2015 |
| WO | WO 2016/100201 A1 | 6/2016 |

OTHER PUBLICATIONS

CN 102686674 Machine translation (Year: 2012).*
International Search Report and Written Opinion for International Application No. PCT/EP2018/072483, entitled: "Film-Forming Dispersion and Sizing Dispersion," dated Sep. 27, 2018.
Notification of Transmittal of the International Preliminary Report on Patentability for International Application No. PCT/EP2018/072483, entitled: "Film-Forming Dispersion and Sizing Dispersion," dated Jul. 25, 2019.
"Plastic and Rubber Processing Aids", edited by Shanxi Institute of Chemical Industry, Chemical Industry Press, Jun. 1997; Foreign Text (English Translation of OA attached).
Wenrum, H., "Silane Coupling Agent and Silicone Resin," Sichuan Science and Technology Press, Aug. 2010; Foreign Text (English Translation of OA attached).

* cited by examiner

*Primary Examiner* — Edward J Cain
(74) *Attorney, Agent, or Firm* — Hamilton, Brook, Smith & Reynolds, P.C.

(57) ABSTRACT

The present invention relates to a film-forming dispersion comprising a functionalized polyamide and water.

15 Claims, No Drawings

FILM-FORMING DISPERSION AND SIZING DISPERSION

This application is the U.S. National Stage of International Application No. PCT/EP2018/072483, filed Aug. 21, 2018, which designates the U.S., published in English, and claims priority under 35 U.S.C. § 119 or 365(c) to European Application No. 17187074.4, filed Aug. 21, 2017. The entire teachings of the above applications are incorporated herein by reference.

FIELD OF THE INVENTION

The present invention relates to a film-forming dispersion and a sizing dispersion comprising a functionalized polyamide and water, preferably to be applied on carbon fibres.

BACKGROUND OF THE INVENTION

Thermoplastic composites are essentially the combination of a thermoplastic resin matrix (e.g. polyamide (PA), polypropylene (PP), polybutylene terephthalate (PBT), polycarbonate (PC), polyphenylsulphide (PPS), polyether ether ketone (PEEK), polyether imide (PEI), etc.) and reinforcing fibres (e.g. glass, carbon, aramid fibres, etc.). Reinforcing fibres, which can be short, long or continuous, allow the use of thermoplastic composites in structural applications, where significant loads are involved. The fibre-resin matrix interphase is where the loads are transferred from the resin matrix to the fibres.

Fibres are typically coated with a film-forming composition or a sizing, generally applied to the fibre's surface once they are drawn out of a bushing. Sizing or film forming on one hand improves fibre processing, allowing their handling; on the other hand it improves the interfacial strength, which has a strong influence on the mechanical properties of the final composite. Sizing or film-forming compositions typically comprise several components with different functions: film formers (polymer-based water emulsions/dispersions of different chemical nature which allow film formation during fibre processing), coupling agents for sizing compositions (mainly silanes which influence bonding between resin matrix and reinforcing fibres), lubricants, antistatic agents, pH adjusters, crosslinkers, etc.

Within thermoplastic composites a significant portion of the market is represented by composites based on a polyamide resin matrix, such as PA6, PA66, PA12; which are particularly suited in applications where high temperature and high hydrolysis resistances are required. Currently most of the film-forming compositions and sizing compositions used in polyamide-based fibre reinforced thermoplastic composites are based on polyurethane (PU) film formers of various nature (aliphatic, blocked, crosslinked polyurethane, etc.). Polyurethane film formers allow relatively good fibre processing and provide compatibility between polyamide resin matrix and the reinforcing fibres. However, they are not very resistant to high temperatures. After film-forming or sizing is applied on the fibres, the fibres are typically heated, the fibres may be stored, before the liquid resin is applied during compounding. For some resins, the melting point is significantly high, for example around 268° C. for nylon 66, or around 285° C. for PPS. Hence, the formed film or sizing needs to be able to sufficiently resist high temperatures. Decomposition of the formed film or sizing at these elevated temperatures may lead to defects in the formed film or sizing, defects in the fibre-resin matrix interphase and hence may deteriorate the mechanical properties of the composite.

In order to obtain a (preferably organic solvent-free) polymer water dispersion suitable for fibre sizing or film-forming applications, some key characteristics are preferably present:
  the polymer shows good water compatibility/affinity and good polarity to form a dispersion in water which is stable over time without giving any sedimentation, aggregation, flocculation, etc.;
  and especially for fibre sizing or film-forming on glass reinforcing fibres:
  the polymer water dispersion has a good stability when mixed with silanes (e.g. aminosilanes, epoxy silanes) in sizing formulations, preferably for at least 72 hours without giving any precipitation, sedimentation etc.; and/or,
  the colour of the polymer is white or slightly yellow, in order to not influence colour of final polymer water dispersion; dark colour dispersions when applied on fibres (e.g. glass fibres) affect their final appearance (dark glass fibres are typically not accepted in the market).

When using an amine-functionalized polyamide in the absence of a solvent it appears to be impossible to obtain a stable polyamide water dispersion due to polymer/water compatibility issues. When functionalizing a polyamide with maleic anhydride the colour of the modified polymer (and therefore of the final water dispersion) is dark. This is thus not acceptable for use in glass fibre film forming or sizing applications, especially when transparent resins or light coloured resins are being used.

SUMMARY OF THE INVENTION

The present invention solves one or more of the problems cited above. Preferred embodiments of the present invention solve one or more of the other problems cited above. More in particular, the present invention allows for improved high temperature resistance. (Preferred) embodiments of one aspect are also (preferred) embodiments of another aspect.

In an aspect, the invention relates to a film-forming dispersion comprising a functionalized polyamide and water, wherein said functionalized polyamide is a carboxylic compound functionalized polyamide and/or a sulfonated compound functionalized polyamide; and in that said functionalized polyamide is at least partially reacted with one or more neutralizing agents in the presence of water.

In some preferred embodiments, the solid content of the film-forming dispersion is at least 10% to at most 60%, preferably at least 15% to at most 50%, more preferably at least 20% to at most 45%, even more preferably at least 25% to at most 40%, and most preferably at least 30% to at most 35%; the solid content determined according to ISO 3251: 2008.

In some preferred embodiments, at least 31 weight %, preferably at least 35 weight %, more preferably at least 50 weight %, even more preferably at least 45 weight % yet even more preferably at least 75 weight % and most preferably at least 90 weight % of the solid content of the film-forming dispersion is functionalised polymer, based on the total weight of solid content of the film-forming dispersion.

In some preferred embodiments, the film-forming dispersion comprises a neutralizing agent, preferably wherein the neutralizing agent is a base, more preferably wherein the neutralizing agent is selected from the group comprising: amines, preferably a secondary, tertiary, or quaternary amine, for example diethylethanolamine, or trimethylamine, diethanolamine; and/or an inorganic hydroxide, for example sodium hydroxide or potassium hydroxide.

In some preferred embodiments, the neutralizing agent is present in a molar amount so that the neutralization ratio compared to the amount of acid functionalities of the functionalised polyamide is in the range from 75% to 1000%, preferably from 90% to 750%, preferably from 100% to 750%, more preferably from 100% to 400%, even more preferably from 100% to 300%, and most preferably from 100% to 200%.

In some preferred embodiments, the functionalized polymer is functionalized with one or more linear dicarboxylic acids, preferably selected from the group comprising: adipic acid, sebacic acid, and isophthalic acid.

In some preferred embodiments, the sulfonated compound comprises at least two carboxyl groups and at least one sulfonate group, preferably also comprises an aromatic moiety, more preferably an dicarboxbenzensulfonic acid salt, even more preferably 3,5-dicarboxbenzensulfonic acid salt, most preferably sodium 3,5-dicarboxbenzensulfonic acid salt.

In some preferred embodiments, the functionalized polyamide has an acid value of at least 10 to at most 100 (mg KOH)/g, determined by a potentiometric titration method according to ISO 2114-2000.

In some preferred embodiments, the mean particle size of the dispersed particles in the dispersion is at least 5 nm to at most 1000 nm, determined by laser scattering in distilled water.

In some embodiments, the film forming dispersion is a dispersion of particles in a liquid phase.

In some preferred embodiments, the film-forming dispersion further comprises at least 1 to at most 20% by weight of a non-ionic surfactant, more preferably of at least 3 to at most 15% by weight, even more preferably of at least 4 to at most 12% by weight and most preferably of at least 5 to at most 10% by weight, compared to the weight of the functionalized polyamide.

In some preferred embodiments, the film-forming dispersion is essentially free from catalyst and/or essentially free from solvent (other than water).

In some preferred embodiments, the weight loss of said functionalized polyamide is at most 15%, preferably at most 10%, more preferably at most 8%, determined by thermogravimetric analysis at 350° C. in air atmosphere in a closed oven, starting from 15 mg functionalized polyamide, heated from 50° C. to 400° C. over a period of 70 min.

In an aspect, the invention relates to a sizing dispersion comprising:
the film-forming dispersion according to an embodiment of the invention; and,
a silane, preferably selected from the group comprising: an aminosilane, an epoxysilane, or mixtures thereof; preferably an aminosilane.

In an aspect, the invention relates to a composition comprising fibres, preferably carbon fibres, treated with:
the film-forming dispersion according to an embodiment of the invention; or,
the sizing dispersion according to an embodiment of the invention; and, a resin, preferably a thermoplastic resin.

In an aspect, the invention relates to a method for forming a fibre reinforced resin article, comprising the steps of:
providing fibres, preferably carbon fibres;
treating said fibres with the film-forming dispersion according to an embodiment of the invention or the sizing dispersion according to an embodiment of the invention, thereby obtaining treated fibres; and,
applying resin to said treated fibres.

In an aspect, the invention relates to a fibre reinforced article comprising fibres, preferably carbon fibres, treated with the film-forming dispersion according to an embodiment of the invention; or, —the sizing dispersion according to an embodiment of the invention; and a resin.

In an aspect, the invention relates to use of the film-forming dispersion as described above as a film-forming agent on fibres, preferably carbon fibres.

DETAILED DESCRIPTION OF THE INVENTION

Before the present unit and method of the invention is described, it is to be understood that this invention is not limited to particular units and methods or combinations described, since such units and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints. Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Parenthesized and/or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

In an aspect, the invention relates to film-forming dispersion comprising a functionalized polyamide and water, wherein said functionalized polyamide is a carboxylic compound functionalized polyamide and/or a sulfonated compound functionalized polyamide; and in that said functionalized polyamide is at least partially reacted with one or more neutralizing agents in the presence of water. Preferably, at least 31 weight %, preferably at least 35 weight %, more preferably at least 50 weight %, even more preferably at least 45 weight % yet even more preferably at least 75 weight % and most preferably at least 90 weight % of the solid content of the film-forming dispersion is functionalised polymer, based on the total weight of solid content of the film-forming dispersion.

In some embodiments, the invention relates to a film-forming dispersion comprising a functionalized polyamide and water, wherein said functionalized polyamide is a carboxylic compound functionalized polyamide and/or a sulfonated compound functionalized polyamide and wherein said functionalized polyamide is at least partially reacted with one or more neutralizing agents in the presence of water, wherein the solid content of the film-forming dispersion is at least 10% to at most 60%, preferably at least 15% to at most 50%, more preferably at least 20% to at most 45%, even more preferably at least 25% to at most 40%, and most preferably at least 30% to at most 35%; the solid content determined according to ISO 3251:2008.

The term "dispersion" refers to a system in which discrete particles of one material are dispersed in a continuous phase of another material. Preferably, the continuous phase is a liquid, more preferably the continuous phase comprises water, even more preferably the continuous phase comprises at least 75 weight % water, yet more preferably at least 90 weight % water and most preferably at least 95 weight % water. In some embodiments, the dispersion is a system wherein discrete particles are suspended in a continuous aqueous phase.

In some embodiments, the particle size of the solid particles in the film-forming dispersion is at least 1 nanometre, more preferably at least 5 nanometre, even more preferably at least 10 nanometre, yet more preferably at least 25 nanometre and most preferably at least 50 nanometre.

In some embodiments, the particle size of the solid particles in the film-forming dispersion is at most 10.000 nanometre, more preferably at most 1000 nanometre, even more preferably at most 750 nanometre, yet more preferably at most 500 nanometre and most preferably at most 250 nanometre.

In some embodiments, the particle size of the solid particles in the film-forming dispersion is at least 1 to at most 10.000 nanometre, more preferably at least 5 to at most 1000 nanometre, even more preferably at least 10 to at most 750 nanometre, yet more preferably at least 25 to at most 500 nanometre and most preferably at least 50 to at most 250 nanometre.

The invention also relates to a method for preparing a film-forming dispersion comprising a functionalized polyamide and water, comprising the steps of:
  functionalizing a polyamide with a carboxylic compound and/or a sulfonated compound; and,
  reacting the functionalized polyamide at least partially with one or more neutralizing agents in the presence of water. The step of at least partially reacting said functionalized polyamide with neutralizing agent is further also referred to as the neutralisation step or neutralisation reaction.

The inventors have found that such a film-forming dispersion, and preferred embodiments thereof, show a significant improvement in thermal resistance compared with current commercial polyurethane film formers. This is shown in the results of thermogravimetric analysis TGA, where a weight loss of less than 15% is obtained with polyamide film former at 350° C. in air environment compared with a weight loss of 25-30% obtained with commercial polyurethane film former in the same testing conditions, as exemplified in the Example Section.

In some preferred embodiments, the film-forming dispersion comprises a neutralizing agent, capable to at least partially neutralize the acid groups of the functionalized polyamide. Preferably the neutralizing agent is a base, more preferably the neutralizing agent is selected from the group comprising: amines, preferably a secondary, tertiary, or quaternary amine, for example diethylethanolamine (DEEA), trimethylamine (TMA), tri-ethylamine (TEA), diethanolamine (DEA) or mixtures thereof, more preferably diethylethanolamine (DEEA) or tri-ethylamine (TEA) and most preferred the neutralizing agent is tri-ethylamine (TEA); and/or an inorganic hydroxide, for example sodium hydroxide or potassium hydroxide. The inventors have found that such a neutralization agent allows obtaining a stable dispersion of said functionalized polyamide in water. The listed neutralizing agents can also provide very high thermal resistance of the functionalized polyamide water dispersion. Furthermore, such a neutralization agent may provide at the same time a very good stability of optional silanes in the dispersion.

In some preferred embodiments, the neutralizing agent is present in a molar amount so that the neutralization ratio compared to the amount of acid functionalities of the functionalised polyamide is in the range from at least 75% to at most 1000%, preferably from at least 100% to at most 750%, more preferably from at least 100% to at most 300%, even more preferably from at least 102% to at most 500%, even more preferably from at least 102% to at most 200%, yet even more preferably from at least 104% to at most 400%, yet even more preferably from at least 104% to at most 200%, and most preferably from at least 105% to at most 200%, like at least 105% to at most 120%. The term "neutralization ratio" as used herein refers to the amount of base functionalities (expressed in moles) used in the neutralisation reaction over the amount of acid functionalities (expressed in moles) present in the functionalized polyamide. Preferably the neutralizing ratio is determined by amine value determination, according to TM 5253. Such neutralization ratios result in a good polyamide water dispersion stability by itself and when used in combination with coupling agents, preferably silanes.

In some embodiments, the neutralizing agent is diethylethanolamine (DEEA), preferably at a neutralizing ratio from 75 to 200%, more preferably at least 100% to at most 200%, even more preferably at least 100% to at most 175%, yet more preferably at least 102% to at most 150%, still yet more preferably at least 104% to at most 125% and most preferably around 105%.

In some embodiments, the neutralizing agent is tri-ethylamine (TEA), preferably at a neutralizing ratio from at least 100 to at most 600%, more preferably at least 100 to at most 500%, even more preferably at least 100% to at most 400%, for example from at least 200 to at most 600%, for example at least 250 to at most 500%, for example at least 300% to at most 450% and for example around 400%.

In some embodiments, the neutralizing agent is:
diethylethanolamine (DEEA), preferably at a neutralizing ratio from 75 to 200%, more preferably at least 100% to at most 200%, even more preferably at least 100% to at most 175%, yet more preferably at least 102% to at most 150%, still yet more preferably at least 104% to at most 125% and most preferably around 105%; and/or,
tri-ethylamine (TEA), preferably at a neutralizing ratio from at least 100 to at most 600%, more preferably at least 100 to at most 500%, even more preferably at least 100% to at most 400% and most preferably at least 200% to at most 400%, for example from 200 to at most 600%, for example from at least 250 to at most 500%, for example from at least 300% to at most 450% and for example around 400%.

In some embodiments, the acid-functionalized polyamide is reacted in the absence of any catalyst with the neutralizing agent.

In some embodiments, the film-forming dispersion comprises at most 20% by weight, preferably at most 15% by weight, more preferably at most 10% by weight, even more preferably at most 8% by weight, and most preferably at most 6% by weight of said functionalized polyamide, with % by weight expressed compared to the total weight of the film-forming dispersion.

In some embodiments, the film-forming dispersion comprises at least 1% by weight, preferably at least 2% by weight, more preferably at least 3% by weight, even more preferably at least 4% by weight, and most preferably at least 5% by weight of said functionalized polyamide, with % by weight expressed compared to the total weight of the film-forming dispersion.

In some preferred embodiments, the film-forming dispersion comprises from at least 1% to at most 20% by weight, preferably from at least 2% to at most 15% by weight, more preferably from at least 3% to at most 10% by weight, even more preferably from at least 4% to at most 8% by weight, and most preferably from at least 5% to at most 6% by weight of said functionalized polyamide, with % by weight expressed compared to the total weight of the film-forming dispersion. Film-forming dispersions with such amounts of functionalized polyamide have the right amount of film former on fibres during application which results in good processing and/or mechanical properties.

In some embodiments, the functionalized polyamide has a number average molecular weight (Mn) from at least 2 000 Da to at most 15 000 Da, more preferably from at least 2 000 Da to at most 8 000 Da, and most preferably from at least 2 000 Da to at most 5 000 Da. Preferably, the number average molecular weight (Mn) is determined by gel permeation chromatography by dissolving the functionalized polyamide in an appropriate solvent e.g. hexafluoroisopropanol and preferably compared to monodisperse polystyrene standards. Such ranges provide good processability and/or good thermal resistance properties.

In some embodiments at least one terminus of said functionalized polyamide is a carboxylic acid group, more preferably both termini of the functionalized polyamide are carboxylic acid groups. This gives the functionalized polyamide after neutralisation surface-active properties, which are necessary to provide a film on the surface of the fibres during sizing. The surface-active properties also provide a good compatibility with water and/or provide a stable dispersion of the polyamide.

In some preferred embodiments, the functionalized polyamide is a functionalized aliphatic polyamide. In some alternative embodiments, the functionalized polyamide is a functionalized aromatic polyamide. Especially, functionalized aromatic polyamide may provide a high hydrolysis resistance.

The functionalized polyamide is a carboxylic compound functionalized polyamide and/or a sulfonated compound functionalized polyamide. In some preferred embodiments, the functionalized polymer is functionalized with linear dicarboxylic acids, preferably selected from the group comprising: adipic acid, sebacic acid, and isophthalic acid. The inventors have found that when the carboxylic compound is such a linear dicarboxylic acid, the colour of the functionalized polyamide and/or the colour that is left on the fibres after film forming and/or sizing is white to slightly light yellow.

In some embodiments, the polyamide (preferably comprising difunctional amines) is reacted with dicarboxylic acids in the presence of water. The final acid functionality is determined by the excess of acid equivalents used. The excess of carboxylic groups provides good water affinity, preferably after neutralization.

In some embodiments, the functionalized polymer is functionalized with non-linear carboxylic acids, such as isophthalic acid. However this may have an impact on the colour of the film-forming dispersion and/or on the colour that is left on the fibres after sizing.

In some embodiments, the functionalised polymer comprises at least one polyamide section, said polyamide section being functionalized by an acid functionality, preferably an dicarboxylic acid functionality, covalently bound, preferably via an amide bond, to an atom of the repeating unit of said at least one polyamide section. The term polyamide section may refer to a section of the polymeric backbone wherein the different monomers are bound to each other by amide bonds.

In some preferred embodiments, the sulfonated compound comprises at least two carboxyl groups and at least one sulfonate group. Preferably, the sulfonated compound also comprises an aromatic moiety, more preferably a dicarboxybenzensulfonic acid salt, even more preferably 3,5-dicarboxybenzensulfonic acid salt, most preferably sodium 3,5-dicarboxybenzensulfonic acid salt.

The presence of sulfonated groups in polyamide provides the right polarity/water affinity to the polymer, which results in a stable water dispersion with the right characteristics for fibre film forming and/or sizing applications.

In some embodiments, the functionalized polyamide (before it has been in contact with the neutralization agent) has an acid value of at least 10 (mg KOH)/g, preferably at least 15 (mg KOH)/g, more preferably at least 20 (mg KOH)/g, even more preferably at least 30 (mg KOH)/g, and most preferably at least 45 (mg KOH)/g, determined by a potentiometric titration method according to ISO 2114-2000.

In some embodiments, the functionalized polyamide (before it has been in contact with the neutralization agent) has an acid value of at most 100 (mg KOH)/g, preferably at most 75 (mg KOH)/g, more preferably at most 60 (mg KOH)/g, even more preferably at most 55 (mg KOH)/g, and most preferably at most 50 (mg KOH)/g determined by a potentiometric titration method according to ISO 2114-2000.

In some preferred embodiments, the functionalized polyamide (before it has been in contact with the neutralization agent) has an acid value of at least 10 to at most 100 (mg KOH)/g, preferably at least 15 (mg KOH)/g to at most 75 (mg KOH)/g, more preferably at least 20 (mg KOH)/g to at most 60 (mg KOH)/g, even more preferably at least 30 (mg KOH)/g to at most 55 (mg KOH)/g, and most preferably at least 45 (mg KOH)/g to at most 50 (mg KOH)/g, determined by a potentiometric titration method according to ISO 2114-2000. Such acid values have a positive contribution on the long-term stability of polyamide water dispersion, preferably in combination with coupling agents, preferably silanes, wherein the stability of the dispersion being determined according to SB 108 test method. Such acid values also may affect the molecular weight of functionalized polyamide.

In some preferred embodiments, the mean particle size of the dispersed particles in the dispersion is at least 5 nm to at most 1000 nm, preferably at least 8 nm to at most 800 nm, more preferably at least 10 nm to at most 500 nm, even more preferably at least 20 nm to at most 300 nm, and most preferably at least 30 nm to at most 200 nm determined by laser scattering in distilled water. Such particle sizes positively affect the long-term dispersion stability, preferably determined according to TM 5151 test method.

In some preferred embodiments, the film-forming dispersion further comprises a non-ionic surfactant. In some preferred embodiments, the film-forming dispersion further comprises at least 1% by weight to at most 20% by weight of a non-ionic surfactant, more preferably of at least 3% by weight to at most 15% by weight, most preferably of at least 5% by weight to at most 10% by weight, compared to the weight of the functionalized polyamide.

In some preferred embodiments, said non-ionic surfactant is selected from the group comprising: an ethoxylated castor oil, an alkoxylated ethylene diamine or a block copolymer of comprising ethylene oxide and propylene oxide, preferably a tri-block ethylene oxide and propylene oxide copolymer.

In some preferred embodiments, the film-forming dispersion further comprises at least 1% by weight to at most 20% by weight of a non-ionic surfactant, more preferably of at least 3% by weight to at most 15% by weight, most preferably of at least 5% by weight to at most 10% by weight, compared to the weight of the functionalized polyamide, wherein the non-ionic surfactant is selected from the group comprising: a polyester comprising castor oil, ethoxylated castor oil, an alkoxylated ethylene diamine, and/or a block copolymer comprising ethylene oxide and propylene oxide.

The inventors have found that such non-ionic surfactants further contribute to the thermal resistance properties of the dispersion. Such non-ionic surfactants may provide a manageable viscosity of the dispersion. Preferably, the viscosity of the dispersion at 25° C. is at least $1 \cdot 10^{-4}$ Pa·s to at most 5.0 Pa·s, preferably at least $1 \cdot 10^{-3}$ Pa·s to at most 3.5 Pa·s, more preferably at least $1 \cdot 10^{-2}$ Pa·s to at most 2.5 Pa·s.

In some preferred embodiments, the film-forming dispersion is essentially free from catalyst and/or essentially free from solvent (other than water). In some embodiments, the film-forming dispersion is essentially free from zinc catalysts and/or tin catalysts, such as dibutyltindilaurate. In some embodiments, the film-forming dispersion is essentially free from acetone and/or 1-methoxy-2-propanol.

The phrase "the composition is essentially free of a compound" means that the composition does not comprise said compound other than as unavoidable impurities that found their way into the composition as impurities in the starting materials or as residues after a purification step to specifically remove said compound.

In some preferred embodiments, the weight loss of said functionalized polyamide is at most 15%, preferably at most 10%, more preferably at most 8%, determined by thermogravimetric analysis at 350° C. in air atmosphere in a closed oven, starting from 10 to 15 mg functionalized polyamide, preferably starting from 15 mg functionalized polyamide, heated from 50° C. to 400° C. over a period of 70 min.

In some embodiments, the solid content of the film-forming dispersion is at least 10% to at most 60%, preferably at least 15% to at most 50%, more preferably at least 20% to at most 45%, even more preferably at least 25% to at most 40%, and most preferably at least 30% to at most 35%; the solid content determined according to ISO 3251:2008. It has been observed that such a solid content provides an increased thermal stability, especially at higher temperature such as 350° C., of the film forming composition and/or the sizing dispersion.

In some preferred embodiments, at least 31 weight %, preferably at least 35 weight %, more preferably at least 50 weight %, even more preferably at least 45 weight % yet even more preferably at least 75 weight % and most preferably at least 90 weight % of the solid content of the film-forming dispersion is functionalised polymer, based on the total weight of solid content of the film-forming dispersion. Especially for the high temperature resistance of the film formed by the film forming dispersion, it is beneficial that a high percentage of the solids in the dispersion is functionalised polymer; large amounts of other solids, such as surfactants and/or un-functionalised polymer, do not contribute to the high temperature resistance, or even worse may decrease the high temperature resistance.

In some embodiments, the solid content of the film-forming dispersion is at least 10% to at most 60%, preferably at least 15% to at most 50%, more preferably at least 20% to at most 45%, even more preferably at least 25% to at most 40%, and most preferably at least 30% to at most 35%; the solid content determined according to ISO 3251:2008. It has been observed that such a solid content provides an increased thermal stability, especially at higher temperature such as 350° C., of the film forming composition and/or the sizing dispersion; and at least 35 weight %, more preferably at least 50 weight %, even more preferably at least 45 weight % yet even more preferably at least 75 weight % and most preferably at least 90 weight % of the solid content of the film-forming dispersion is functionalised polymer, based on the total weight of solid content of the film-forming dispersion.

In some embodiments, the solid content of the film-forming dispersion is at least 10% to at most 60%; the solid content determined according to ISO 3251:2008. It has been observed that such a solid content provides an increased thermal stability, especially at higher temperature such as 350° C., of the film forming composition and/or the sizing dispersion; and at least 35 weight %, more preferably at least 50 weight %, even more preferably at least 45 weight % yet even more preferably at least 75 weight % and most preferably at least 90 weight % of the solid content of the film-forming dispersion is functionalised polymer, based on the total weight of solid content of the film-forming dispersion.

In some embodiments, the solid content of the film-forming dispersion is at least 10% to at most 60%, preferably at least 15% to at most 50%, more preferably at least 20% to at most 45%, even more preferably at least 25% to at most 40%, and most preferably at least 30% to at most 35%; the solid content determined according to ISO 3251:2008. It has been observed that such a solid content provides an increased thermal stability, especially at higher temperature such as 350° C., of the film forming composition and/or the sizing dispersion; and at least 35 weight % of the solid content of the film-forming dispersion is functionalised polymer, based on the total weight of solid content of the film-forming dispersion.

In some embodiments, the solid content of the film-forming dispersion is at least 10% to at most 60%, preferably at least 15% to at most 50%, more preferably at least 20% to at most 45%, even more preferably at least 25% to at most 40%, and most preferably at least 30% to at most 35%; the solid content determined according to ISO 3251:2008. It has been observed that such a solid content provides an increased thermal stability, especially at higher temperature such as 350° C., of the film forming composition and/or the sizing dispersion; and at least 50 weight % of the solid content of the film-forming dispersion is functionalised polymer, based on the total weight of solid content of the film-forming dispersion.

In some embodiments, the film-forming dispersion may be used directly as sizing dispersion on/for carbon fibres.

In an aspect, the invention relates to a sizing dispersion, especially for glass fibres, comprising:
   the film-forming dispersion according to an embodiment of the invention; and,
   a silane, preferably selected from the group comprising:
      an aminosilane such as γ-aminopropyltriethoxysilane,
      an epoxysilane such as [3-(2,3-epoxypropoxy)propyl] trimethoxysilane, or mixtures thereof; preferably an aminosilane.

Silanes typically act as coupling agents: they provide chemical bonding between fibre reinforcement, especially glass fibre reinforcement, and resin matrix. Said silanes preferably also provide the required chemical compatibility with the thermoplastic resin matrix.

In an aspect, the invention relates to a composition comprising fibres, preferably carbon fibres, treated with:
   the film-forming dispersion according to an embodiment of the invention; or,
   the sizing dispersion according to an embodiment of the invention;
   and, a resin, preferably a thermoplastic resin Preferably, said resin is not the functionalized polyamide as described above.

In some preferred embodiment, said resin is a thermoplastic resin, preferably a thermoplastic resin selected from the group comprising: acrylic resin, acrylonitrile butadiene styrene resin (ABS), polyamide resin (nylon or aramid), polylactic acid resin (PLA), polybenzimidazole resin, polycarbonate resin, polyether sulfone resin, polyetherether ketone resin, polyetherimide resin, polyethylene resin, polyphenylene oxide resin, polyphenylene sulphide resin, polypropylene resin, polystyrene resin, polyvinyl chloride resin, and polytetrafluoroethylene resin (PTFE or Teflon). In a more preferred embodiment, the resin is a polyamide, preferably a nylon or an aramid, more preferably selected from the group comprising PA6, PA66, PA12, PA6/66 or PA66/610, and most preferably selected from the group comprising PA6, PA66, PA6/66.

In some preferred embodiments, the fibres are selected from the group comprising glass fibres, carbon fibres, aramid fibres and natural fibres, preferably the fibres are glass fibres and/or carbon fibres.

In some embodiments, the fibres are carbon fibres, including graphite fibres. In some embodiments, the carbon fibres are pitch type carbon fibres, rayon type carbon fibres, or PAN (polyacrylonitrile) type carbon fibres.

In some embodiments, the carbon fibres may be twisted carbon fibres, untwisted carbon fibres and/or never twisted carbon fibres.

In some embodiments, the fibres, especially the carbon fibres, may be bundles of filaments, preferably each bundle may comprise at least 10 to at most 100.000 filaments, more preferably at least 100 to at most 80.000 filaments, even more preferably at least 500 to at most 60.000 filaments and most preferably at least 1.000 to at most 50.000 filaments.

In some embodiments, the fibres may be arranged in a sheet or fabric, this may be woven fabric, a non-woven fabric or a unidirectional sheet. The sizing of film-forming of said fibres may be done before or after the fibres have been arranged in a fabric or sheet.

In an aspect, the invention relates to a method for forming a fibre, preferably carbon fibre, reinforced resin article, comprising the steps of:
   providing fibres, preferably carbon fibres;
   treating said fibres with the film-forming dispersion according to an embodiment of the invention or the sizing dispersion according to an embodiment of the invention, thereby obtaining treated fibres; and,
   applying resin to said treated fibres.

In some embodiments, the treating of said fibres with the film-forming dispersion or sizing dispersion comprises bringing the fibres in contact with said dispersion followed by drying said fibres, preferably by evaporating the water from the dispersion. Preferably the dispersion is brought in contact with the fibres by means of a roll applicator, preferably a kiss-roll applicator.

In some embodiments, applying resin to the treated fibres involves compounding said treated fibres with the resin, preferably in a melt-blender or in an extruder, more preferably in an extruder.

In an aspect, the invention relates to a fibre reinforced article comprising fibres, preferably carbon fibres, treated with the film-forming dispersion according to an embodiment of the invention; or, —the sizing dispersion according to an embodiment of the invention; and a resin.

In some embodiments, the articles are used in applications which require high temperature and high hydrolysis resistance. In some embodiments, the article is selected from the group comprising:
   under the hood parts in automotive applications;
   semi-structural and structural automotive applications;
   electric and electronic applications (e.g. connectors);
   appliances;
   sports goods; and/or,
   gears and bearings.

In an aspect, the present invention relates to the use of the film-forming dispersion as described above as a film-forming agent on fibres, preferably carbon fibres, also referred to herein as a film former. In some preferred embodiments, the film-former agent is solvent-free. In some embodiments, the film-former agent is used for sizing compositions in fibre reinforced thermoplastic composites, most particularly for polyamide-based composites. The film-former overcomes most of the limitations in current sizing formulations based on polyurethane film formers, such as a limited high temperature and hydrolysis resistance.

The film-former dispersion can be used as the only film former in the final sizing composition or it can be used as the main film former in combination with other co-film formers of different chemical nature such as: polyurethane, epoxy, epoxy-ester, and/or epoxy-urethane.

Preferably, the thickness of the film is at least 10 nm to at most 500 nm, more preferably at least 30 nm to at most 400 nm, more preferably at least 50 nm to at most 300 nm, even more preferably at least 70 nm to at most 200 nm, and most preferably at least 90 nm to at most 150 nm, like around 100 nm.

EXAMPLES

To better illustrate the properties, advantages and features of the present invention some preferred embodiments are disclosed as examples. Accordingly, the present invention discloses many embodiments and adjustments as appreciated by those skilled in the art and the scope of the present invention is by no means limited to one the illustrative examples presented below.

The following test methods were used in the examples. These test methods are also preferred test methods to obtain the relevant parameters.

Acid Value Determination

The acid value, expressed as mg KOH/g sample, was obtained via a potentiometric titration method, according to ISO 2114-2000.

Amine Value Determination (TM 5253)

The content of amine groups, expressed as meq $NH_2$/g or mg KOH/g sample, was obtained via a potentiometric titration method as described below A prescribed amount of material is weighed in a beaker; the material is dissolved in a solvent (e.g. methanol): when the material is completely dissolved, a titrating solution (e.g. HBr in acetic acid 0.05N) is added and potentiometric titration is performed by using an automated dosing apparatus (e.g. Titrino PLUS 818 from Metrohm).

Amine value (meq $NH_2$/g)=(V*N HBr)/m

Amine value (meq KOH/g)=Amine value (meq $NH_2$/g)* PE KOH

V=Volume (ml) of HBr needed to reach the equivalent point

N HBr=Normality of HBr solution m=amount of material (g)

PE KOH=KOH equivalent weight (56.1 g/eq)

Thermogravimetric Analysis (TGA)

This method was used to determine the weight loss of a material in a specific temperature range, in nitrogen or air environment, as described below:

Typical instruments used for these measurements are METTLER TG50, METTLER M3, METTLER TC10A/TC15 TA CONTROLLER from METTLER TOLEDO.

A prescribed amount of dried material is weighed in a crucible; the material is then subjected to a heating ramp in a closed oven till the desired temperature value under nitrogen or air flow. The graph generated by the machine is then elaborated in order to have the weight loss at a specific temperature.

In this specific example, 10-15 mg dried film-forming dispersion was used, that was heated up from 50° C. to 400° C. over a period of 70 min in an air atmosphere.

TABLE 1A

| Temp ° C. | Comparative example 1 | Comparative example 2 | Comparative example 3 | Comparative example 4 | Comparative example 5 | Comparative example 6 | Invention |
|---|---|---|---|---|---|---|---|
| 50 | 100.00 | 100.00 | 100.00 | 100.00 | 100.00 | 100.00 | 100.00 |
| 75 | 98.85 | 99.45 | 98.69 | 99.46 | 100.00 | 99.59 | 99.57 |
| 100 | 98.77 | 99.29 | 98.66 | 99.32 | 100.00 | 99.50 | 99.46 |
| 125 | 98.68 | 99.13 | 98.66 | 99.17 | 100.00 | 99.47 | 99.35 |
| 150 | 98.60 | 98.96 | 98.64 | 99.02 | 100.00 | 99.45 | 99.31 |
| 175 | 98.53 | 98.81 | 98.62 | 98.88 | 99.57 | 99.44 | 99.12 |
| 200 | 98.43 | 98.63 | 98.57 | 98.72 | 97.65 | 99.42 | 98.62 |
| 225 | 98.03 | 98.28 | 98.38 | 98.31 | 93.76 | 99.37 | 98.38 |
| 250 | 97.15 | 97.44 | 97.96 | 97.55 | 90.24 | 99.17 | 97.79 |
| 275 | 95.93 | 95.99 | 96.94 | 96.27 | 87.70 | 98.39 | 97.19 |
| 300 | 92.75 | 92.60 | 93.36 | 92.89 | 85.02 | 96.25 | 96.69 |
| 325 | 83.31 | 84.13 | 82.69 | 84.34 | 80.77 | 91.57 | 95.17 |
| 350 | 66.56 | 69.76 | 64.58 | 68.35 | 73.38 | 83.66 | 92.83 |
| 375 | 44.47 | 48.70 | 40.97 | 43.19 | 61.71 | 68.75 | 88.72 |

Table 1A illustrates the weight loss at various temperatures for various dried film-former dispersions.

Comparative examples 1-6 refer to dried film-forming dispersions (without any silane). Comparative examples 1-6 refer to standard polyurethane film-formers, while the invention refers to film-forming dispersion according to an embodiment of the invention, as shown in Table 1B.

TABLE 1B

| PA-COOH (AV = 46.3) | 285.9 |
|---|---|
| Tri-ethylamine (TEA) | 48.2 |
| Maxemul 9107 (surfactant) | 14.3 |
| Demi-water | 651.6 |
| TOTAL | 1000.0 |

The comparative examples are commercially available: Comp. ex.1: Neoxil 9851 (Aliancys); Comp. ex. 2=Neoxil 9851 HF (Aliancys); Comp. ex. 3=Neoxil 8200 A (Aliancys); Comp. ex. 4=Neoxil 8200 A HF (Aliancys); Comp. ex.

5=Baybond PU 405 (Covestro); Comp. ex. 6=Baybond PU 407 (Covestro).

Particle Size Distribution Analysis (TM 5178)

This method was used to determine the average diameter of the particles in a dispersion, expressed in nanometres via a laser scattering method, as described below.

A drop of a dispersion is added to bi-distilled water and mixed until the solution is homogeneous. The solution is then poured in a cuvette and placed in the particle size analyser (e.g. N5 instrument from Beckman-Coulter).

The mean particle size is expressed in nanometres and the particle size distribution profile is expressed as "unimodal" or "bimodal".

Stability of the Dispersion as such (TM 5151)

This method is used to determine the stability over time of a polymer dispersion in water, as described below.

The dispersion is filtered and poured in a closed vessel. Every month the material is checked visually and its appearance is evaluated to assess if there is any separation, flocculation, sedimentation.

Main dispersion properties are also measured and their values are compared with the original ones at the time of production (e.g. particle size).

Appearance of the Dispersion (TM 2265)

This method was used to evaluate the appearance of a polymer dispersion in water as such; results are expressed in a qualitative way, as described below.

Colour: Assesses the colour of the material, e.g. white, yellowish, etc.
Clarity: Assesses the clarity of the material, e.g. clear, hazy, turbid etc.
Contamination: Assesses if there is any contamination and in case there is it gives a description
Homogeneity: Assesses the homogeneity of the material
Status: Assesses the status of the material e.g. liquid, crystalline, powder, etc.

Stability of the Dispersion with Silanes (SB 108)

This method was used to determine the stability/compatibility between a polymer dispersion in water and silane compounds (typically used in fibre sizing compositions) of different chemical nature for at least 72 hours (3 days).

The ratio between polymer dispersion in water and silane compound (e.g. amino-silane or epoxy-silane) is calculated and fixed. Solid content of the final formulation is fixed before preparing the mixture in a plastic beaker.

Test with Amino-Silane

The amino-silane is added to the water under stirring conditions for at least 10 minutes (hydrolysis of the silane). The calculated polymer water dispersion amount is then added to the hydrolysed amino-silane under stirring conditions for at least 10 minutes.

The mix is poured in a plastic closed vessel and left there; its stability over time is evaluated by visual observation (check if there is any separation, flocculation, sedimentation).

Main dispersion properties are also measured and their values are compared with the original ones at the time of production (e.g. particle size).

Test with Epoxy-Silane

The epoxy-silane is added to the polymer water dispersion under stirring conditions for at least 45 minutes. Water is then added to the epoxy-silane/polymer water dispersion mix under stirring conditions for at least 10 minutes.

The mix is poured in a plastic closed vessel and left there; its stability over time is evaluated by visual observation (check if there is any separation, flocculation, sedimentation).

Main dispersion properties are also measured and their values are compared with the original ones at the time of production (e.g. particle size).

Table 2 illustrates various properties for various film forming dispersions. The TGA dispersion test was performed using similar conditions as for Table 1.

TABLE 2

| POLYAMIDE POLYMER | Acid value (mg KOH/g) | Trial number | TGA polymer-weight loss at 350° C. in air (%) | Colour | Neutralizing ratio (%): DEEA | Neutralizing ratio (%): TEA | Neutralizing ratio (%): KOH | Surfactant (%): Int Nx 8877 |
|---|---|---|---|---|---|---|---|---|
| PA-COOH | 48.4 | 6 | 6.6 | yellow | 200 | | | 5 |
| PA-COOH | 48.4 | 7 | 6.6 | yellow | 400 | | | 5 |
| PA-COOH | 48.4 | 8 | 6.6 | yellow | 400 | | | 20 |
| PA-COOH | 48.4 | 9 | 6.6 | yellow | 200 | | | 20 |
| PA-COOH | 46.3 | 10 | 6.4 | yellow | 105 | | | 5 |
| PA-COOH | 46.3 | 11 | 6.4 | yellow | 105 | | | 1 |
| PA-COOH | 46.3 | 22 | 6.4 | yellow | 400 | | | 15 |
| PA-COOH | 46.3 | 23 | 6.4 | yellow | 250 | | | 20 |
| PA-COOH | 46.3 | 24 | 6.4 | yellow | 300 | | | 20 |
| PA-COOH | 46.3 | 25 | 6.4 | yellow | 350 | | | 20 |
| PA-COOH | 46.3 | 26 | 6.4 | yellow | 400 | | | 20 |
| PA-COOH | 46.3 | 27 | 6.4 | yellow | 250 | | | 10 |
| PA-COOH | 46.3 | 30 | 6.4 | yellow | 400 | | | 10 |
| PA-COOH | 46.3 | 31 | 6.4 | yellow | 250 | | | 5 |
| PA-COOH | 46.3 | 34 | 6.4 | yellow | 400 | | | 5 |
| PA-COOH | 29.8 | 41 | 4.1 | yellow | 400 | | | 5 |
| PA-COOH | 29.8 | 45 | 4.1 | yellow | 400 | | | |
| PA-COOH | 29.8 | 47 | 4.1 | yellow | | 400 | | |
| PA-COOH | 29.8 | 48 | 4.1 | yellow | | 400 | | 20 |
| PA-COOH | 25.3 | 52 | 3.2 | yellow | 400 | | | 5 |
| PA-COOH | 25.3 | 53 | 3.2 | yellow | 400 | | | 10 |
| PA-COOH | 25.3 | 54 | 3.2 | yellow | 400 | | | 15 |
| PA-COOH | 25.3 | 55 | 3.2 | yellow | 400 | | | |

TABLE 2-continued

| POLYAMIDE | | | | | |
|---|---|---|---|---|---|
| PA-COOH | 25.3 | 56 | 3.2 | yellow | 400 |
| PA-COOH | 25.3 | 57 | 3.2 | yellow | 400 |
| PA-COOH | 25.3 | 58 | 3.2 | yellow | 313 |
| PA-COOH | 25.3 | 59 | 3.2 | yellow | 243 |
| PA-COOH | 25.3 | 63 | 3.2 | yellow | | 400 |
| PA-COOH | 25.3 | 64 | 3.2 | yellow | | 400 |
| NOVAMID ® 2430A | 1.9 | 75 | 1.5 | White | | 200 |
| NOVAMID ® X21-F07 | 5.7 | 76 | 1.4 | White | | 200 |
| PA-COOH-SO3Na | 50.9 | 77 | 4.5 | yellow | | 200 |
| PA-COOH-SO3Na | 50.9 | 78 | 4.5 | Yellow | | 400 |
| PA-COOH-SO3Na | 50.9 | 79 | 4.5 | yellow | | 400 |

(continued with second part showing 3.9, 3, 5, 5, 5, 5, 5, 5, 20 in last column for some rows)

| POLYAMIDE POLYMER | Surfactant (%): Maxemul 9107 | Surfactant (%): Synperonic PE/F108 | Surfactant (%): Synperonic PE/F127 | Surfactant (%): Synperonic PE/F68 | Surfactant (%): Synperonic T/908 | Stable Dispersion (Y/N) | TGA dispersion-weight loss at 350° C. in air (%) | Aminosilane 3B stability test-7 days | Epoxy silane 3B stability test-7 days |
|---|---|---|---|---|---|---|---|---|---|
| PA-COOH | | | | | | Y | 16.3 | OK | |
| PA-COOH | | | | | | Y | 19.0 | NOK | |
| PA-COOH | | | | | | Y | 20.5 | NOK | |
| PA-COOH | | | | | | Y | 17.6 | OK | |
| PA-COOH | | | | | | Y | 9.2 | | |
| PA-COOH | | | | | | Y | 13.3 | | |
| PA-COOH | | | | | | Y | 11.2 | | |
| PA-COOH | | | | | | Y | 18.7 | | |
| PA-COOH | | | | | | Y | 21.3 | | |
| PA-COOH | | | | | | Y | 20.0 | | |
| PA-COOH | | | | | | Y | 21.3 | | |
| PA-COOH | | | | | | Y | 18.1 | | |
| PA-COOH | | | | | | Y | 20.0 | | |
| PA-COOH | | | | | | Y | 14.8 | | |
| PA-COOH | | | | | | Y | 19.3 | | |
| PA-COOH | | | | | | Y | 22.9 | OK | NOK |
| PA-COOH | 5 | | | | | Y | 21.1 | NOK | NOK |
| PA-COOH | 5 | | | | | Y | 8.9 | OK | |
| PA-COOH | | | | | | Y | 8.7 | OK | |
| PA-COOH | | | | | | Y | 18.5 | NOK | |
| PA-COOH | | | | | | Y | 20.7 | NOK | |
| PA-COOH | | | | | | Y | 18.4 | NOK | |
| PA-COOH | 5 | | | | | Y | 20.7 | NOK | |
| PA-COOH | 10 | | | | | Y | 21.3 | NOK | |
| PA-COOH | 15 | | | | | Y | 22.3 | NOK | |
| PA-COOH | | | | | | Y | 8.4 | NOK | |
| PA-COOH | | | | | | Y | 9.0 | NOK | |
| PA-COOH | | | | | | Y | 7.4 | OK | |
| PA-COOH | 20 | | | | | Y | 14.3 | NOK | |
| NOVAMID ® 2430A | | | | | | N | | | |
| NOVAMID ® X21-F07 | | | | | | N | | | |
| PA-COOH-SO3Na | | | | | | Y | 8.0 | OK | |
| PA-COOH-SO3Na | | | | | | Y | 9.0 | OK | |
| PA-COOH-SO3Na | | | | | | Y | 11.1 | OK | |

PA-COOH stands for acid-functionalized polyamide; in order to obtain said acid-functionalized polyamide (PA-COOH) 1550 grams of isophorone diamine, 343 grams of 2 methyl, 1-5 pentane diamine and 857 grams of demineralised water were charged in a 6 litres glass reactor equipped with a stirrer, nitrogen spurge, a temperature control unit and a distillation glassware. The reaction mixture was stirred until all the ingredients were dissolved. At that point, 2823 grams of sebacic acid were added over a period of 60 minutes, keeping the exothermic reaction below 80° C. After this addition, the mixture was heated slowly to 220° C., while the water was distilled off. After reaching the reaction temperature of 220° C., samples for acid value and amine value measurements were taken every hour. After reaching the targeted acid value, the mixture was vacuum distilled for 30 minutes, then the vacuum was set off and the resin discharged.

For the PA-COOH resins listed in Table 1, the molecular weight ranges from 1800 Da to 15000 Da.

PA-COOH—SO3Na stands for sulfonated-functionalized polyamide; in order to obtain said sulfonated-functionalized polyamide (PA-COOH—SO3Na) 1550 grams of isophorone diamine, 343 grams of 2 methyl, 1-5 pentane diamine and 857 grams of demineralized water were charged in a 6 liters glass reactor equipped with a stirrer, nitrogen spurge, a temperature control unit and a distillation glassware. The reaction mixture was stirred until all the ingredients were dissolved. At that point, 2786 grams of sebacic acid and 47 grams of 3,5 dicarboxybenzensulfonic acid salt were added over a period of 60 minutes, keeping the exothermic reaction below 80° C. After this addition, the mixture was heated slowly to 220° C., while the water was distilled off. After reaching the reaction temperature of 220° C., samples for acid value and amine value measurements were taken every hour. After reaching the targeted acid value, the mixture was vacuum distilled for 30 minutes, then the vacuum was set off and the resin discharged.

For the PA-COOH—SO3Na resins listed in Table 2, the molecular weight ranges from 1800 Da to 15000 Da.

NOVAMID® 2430A and NOVAMID® X21-F07 are polyamides that are not functionalized with carboxylic acid groups or sulfonic groups. These polyamides are commercially available from DSM.

The invention claimed is:

1. Film-forming dispersion comprising a functionalized polyamide and water, wherein said functionalized polyamide is a carboxylic compound functionalized polyamide and/or a sulfonated compound functionalized polyamide and wherein said functionalized polyamide is at least partially reacted with one or more neutralizing agents in the presence of water, wherein at least 35 weight % of the solid content of the film-forming dispersion is functionalized polymer, based on the total weight of solid content of the film-forming dispersion;
wherein the dispersion is a system wherein discrete particles are suspended in a continuous aqueous phase.

2. Film-forming dispersion according to claim 1, comprising a neutralizing agent.

3. Film-forming dispersion according to claim 1, wherein the neutralizing agent is present in a molar amount so that the neutralization ratio compared to the amount of acid functionalities of the functionalized polyamide is in the range from at least 100% to at most 400%.

4. Film-forming dispersion according to claim 1, wherein the functionalized polymer is functionalized with one or more linear dicarboxylic acids.

5. Film-forming dispersion according to claim 1, wherein the sulfonated compound comprises at least two carboxyl groups and at least one sulfonate group.

6. Film-forming dispersion according to claim 1, wherein the functionalized polyamide has an acid value of at least 10 (mg KOH)/g to at most 100 (mg KOH)/g, determined by potentiometric titration according to ISO 2114-2000.

7. Film-forming dispersion according to claim 1, wherein the mean particle size of the dispersed particles in the dispersion is at least 5 nm to at most 1000 nm, determined by laser scattering in distilled water.

8. Film-forming dispersion according to claim 1, further comprising at least 1% by weight to at most 20% by weight of a non-ionic surfactant, compared to the weight of the functionalized polyamide.

9. Film-forming dispersion according to claim 1, wherein the film-forming dispersion is essentially free from catalyst and/or essentially free from solvent.

10. Film-forming dispersion according to claim 1, wherein the weight loss of said functionalized polyamide is at most 15%, determined by thermogravimetric analysis at 350° C. in air atmosphere in a closed oven, starting from 15 mg functionalized polyamide, heated from 50° C. to 400° C. over a period of 70 min.

11. Film-forming dispersion according to claim 1, wherein the film forming dispersion is a dispersion of particles in a liquid phase.

12. Composition comprising:
fibres, treated with:
the film-forming dispersion according to claims 1 to 11; and,
a resin.

13. Method for forming a fibre reinforced resin article, comprising the steps of:
providing fibres;
treating said fibres with the film-forming dispersion according to claims 1 to 11, thereby obtaining treated fibres; and,
applying the resin to said treated fibres.

14. Fibre reinforced article comprising fibres, treated with the film-forming dispersion according any one of claims 1 to 11, and a resin.

15. Use of the film-forming dispersion according to any one of claims 1 to 11 as a film-forming agent on fibres, preferably carbon fibres.

* * * * *